W. C. JEAPES.
CINEMATOGRAPH FILM FEEDING APPARATUS.
APPLICATION FILED MAR. 30, 1920.
1,381,840.
Patented June 14, 1921.
2 SHEETS—SHEET 1.
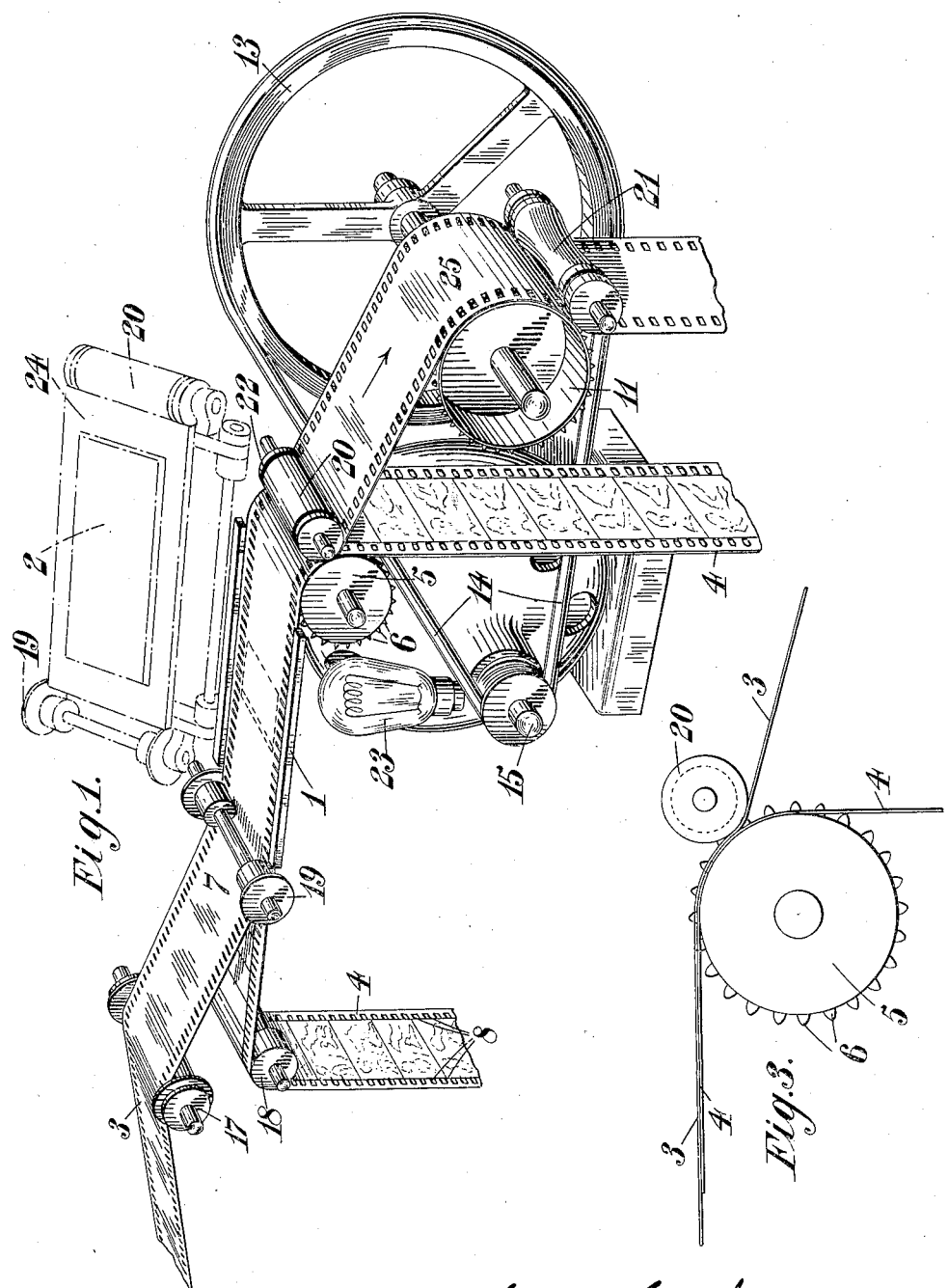

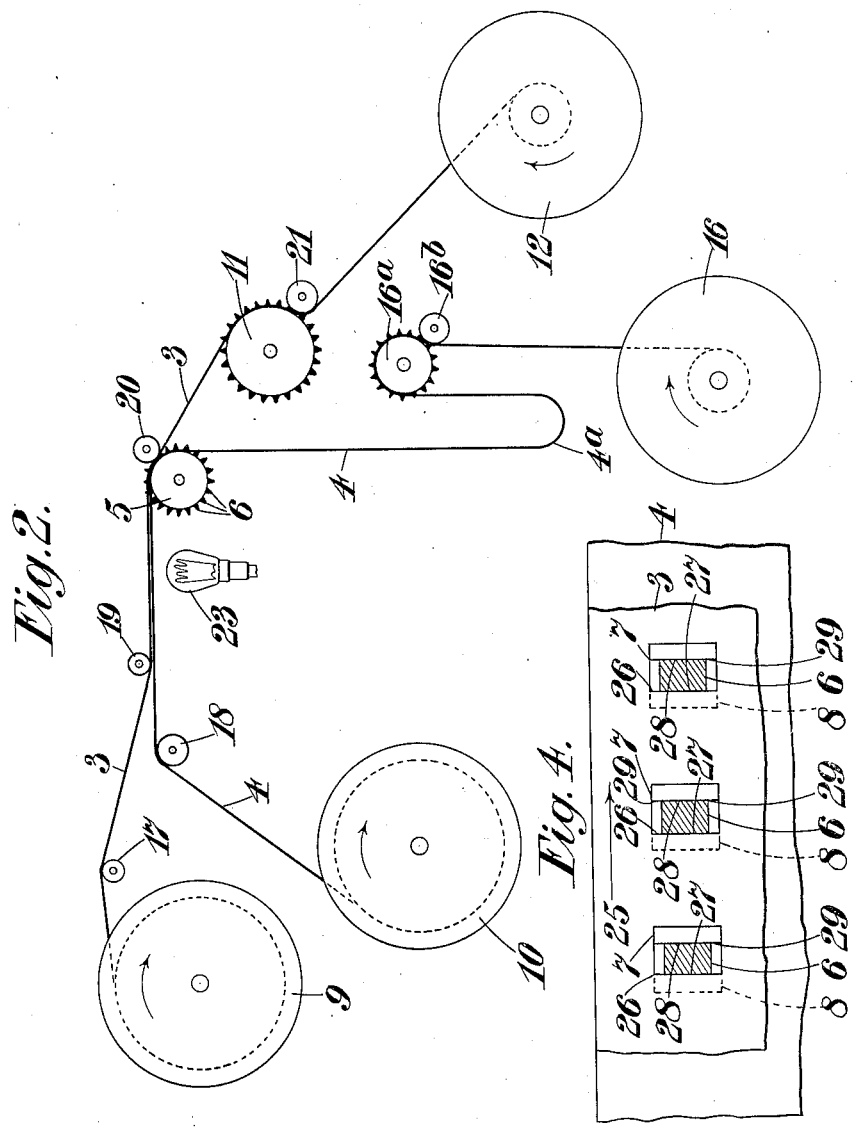

UNITED STATES PATENT OFFICE.

WILLIAM CECIL JEAPES, OF LONDON, ENGLAND.

CINEMATOGRAPH-FILM-FEEDING APPARATUS.

1,381,840.      Specification of Letters Patent.     Patented June 14, 1921.

Application filed March 30, 1920. Serial No. 369,885.

*To all whom it may concern:*

Be it known that I, WILLIAM CECIL JEAPES, subject of the King of England, residing at London, England, have invented certain new and useful Improvements in Cinematograph-Film-Feeding Apparatus, of which the following is a specification.

This invention is for improvements in or relating to cinematograph film-feeding apparatus and has for one of its objects to provide for the production in a quick and economical manner of films free from blurring or other defects.

In the process of developing and fixing pictures taken upon the film, the film is apt to contract, and consequently its feed perforations come slightly closer together than they were before passing through the developing or other baths. Therefore when such a film is used as a negative from which to print a positive, the latter, not having been passed through developing or other baths, will have its feed perforations slightly differently spaced than those in the negative. This difference in spacing, while being very small, becomes distinctly noticeable in a length of film containing say eight exposures, and therefore in the complete film the effect is quite large.

In passing two superimposed films through a film-feeding apparatus forming part, say, of a film-printing machine this discrepancy in the spacing of the feed perforations is liable to cause faults in the film. This is not so much the case with step-by-step film-printing machines, wherein the two films are adjusted relatively to each other and clamped stationary in place for the period of the exposures, as with rotary film-printing machines in which the two films are fed at a rapid rate and without interruption past the printing point. In these rotary machines a sprocket-wheel is employed to feed the films, and its teeth enter the feed perforations in both films. The teeth, however, do not drive continuously directly on both films, but the one is partly carried along by the other by friction. At intervals along the films, however, the feed perforations in the two films become so much out of register with each other that the teeth on the sprocket-wheel in entering the perforations in both films, cause relative movement to take place between the films. Consequently, the particular part of the film being printed upon at that instant becomes blurred. In some cases this occurs as frequently as every eighth exposure along the film.

According to the present invention this defect is obviated by driving one film from the other through the intermediary of a member which engages the feed perforations in both films and is driven by means imparting a pull to one film in advance of the said intermediary member. The invention also provides a method of securing continuous registration of the feed perforations in two superimposed cinematograph films while passing simultaneously through a film-feeding apparatus, which consists in—

(*a*) feeding one film through while maintaining the rearward sides of its feed perforations in engagement with the rear faces of the teeth on a loose sprocket-wheel, to drive the latter, and (*b*) driving the second film by this sprocket-wheel, the front faces of the teeth on the latter maintaining engagement with the forward sides of the feed perforations in the second film.

A cinematograph film-feeding apparatus, has, according to the present invention, in combination, means for pulling a film through the apparatus and a member (for example a loose sprocket-wheel) to enter the feed perforations in such film and in another film superimposed thereon, and thus transmit drive from the one film to the other. Conveniently, in a film-printing machine, the member transmitting the drive from one film to the other is situated closely adjacent the printing point, and guiding means for the films are provided and so arranged that the films first come into contact with each other approximately at the printing point, and break contact with each other approximately at the point where they leave the said transmitting member. By this arrangement the two films are kept in contact with each other throughout the smallest possible portion of their length, and consequently the possibility of friction interfering with the transmission of the drive from one film to the other through the aforesaid transmitting member, is minimized.

For a more complete understanding of the invention there will now be described, with reference to the acompanying drawings and by way of example only, one construction of film-printing machine according to the invention. It is to be understood, however, that the invention is not limited to the precise constructional details enumerated.

In these drawings:—

Figure 1 is a perspective view of certain parts of a cinematograph film-printing machine;

Fig. 2 is a side elevation, more or less diagrammatic, of the film-feeding parts;

Fig. 3 is a side elevation of a detail of the film-printing machine, the parts being shown on a scale larger than that of Figs. 1 and 2, and Fig. 4 is a partial plan, on an enlarged scale, of two superimposed films and a sprocket-wheel meshing with them.

Like reference numerals indicate like parts throughout the drawings.

The machine in question comprises the usual form of printing point used in rotary film-printing machines. This printing point as usual has a flat surface 1 with which a pad 2 coöperates to press the two films 3 and 4 together as they pass in front of the printing point. Closely adjacent the printing point, and with its teeth projecting above the aforesaid flat surface, is mounted a loose sprocket-wheel 5 in position for its teeth 6 to enter the feed perforations 7 and 8 respectively in the films passing the printing point. The films 3 and 4 are led to the printing point from supply spools 9 and 10 spaced one above the other so as to keep the films apart until the printing point is reached. After passing the printing point, and the aforesaid loose sprocket-wheel 5, one film (the film 3 in the particular machine illustrated) is led over a sprocket-wheel 11 and thence to a suitable receiving spool 12 or other receptacle. The sprocket-wheel 11 which, like the sprocket-wheel 5 is preferably provided with two series of teeth to engage the two series of perforations, one toward each side of the film, constitutes the driving medium for securing the passage of the films past the printing point. The sprocket-wheel 11 may itself be driven by any suitable mechanism. In the construction illustrated its shaft carries a pulley 13 which is driven by a belt 14 from a motor shaft 15. The other film (4) after passing the aforesaid loose sprocket-wheel 5 is guided clear of the first film (3) to a similar receiving spool 16 or other receptacle. To avoid such a driving pull being imparted to the film 4 by the winding mechanism for the spool 16 as would interfere with the feed of the film 4 past the printing point by the loose sprocket-wheel 5, the film 4 may be passed, as illustrated, over a driving sprocket-wheel 16ᵃ having a coöperating guiding collar 16ᵇ a loop 4ᵃ in the film being maintained between the wheels 5 and 16ᵃ. The films are only in frictional contact with each other while passing the printing point and the loose sprocket-wheel 5. The films 3 and 4 are guided in their respective paths by rollers 17, 18, 19, 20 and 21, whereof the rollers 20 and 21 which have to coöperate with the sprocket-wheels 5 and 11 may conveniently be provided with bands 22 of resilient or other suitable material, which are situated opposite the teeth of the sprocket-wheels to coöperate therewith.

At the printing point an electric lamp 23 is illustrated as being a suitable means for printing from one film onto the other. The light from this lamp may be controlled in any convenient manner. Preferably the guiding rollers 19 and 20 are, together with the pad 2 carried upon a hinged frame or gate 24 which may be swung into and out of position as desired.

In operation it will be understood that the film 3 which passes over the driven sprocket-wheel 11, and which may be either of the negative or the positive as desired, acts as the driving film. In its passage forward (viz. as indicated by the arrow 25) the rearward sides 26 of its feed perforations 7 are maintained in engagement with the rear faces 27 of the teeth 6 on the loose sprocket-wheel 5 and thereby drive the latter. These teeth 6 also enter the feed perforations 8 in the other film 4 and serve to drive the latter forward, the front faces 28 of the teeth 6 maintaining engagement with the forward sides 29 of the feed perforations 8 therein. It will thus be seen that each perforation in the one film is in turn registered relatively to the corresponding perforation in the other film and thus the difference in the spacing of the perforations in the two films is not allowed to accumulate until the act of registering them entails sufficient relative movement between them to produce a blurred exposure. Very satisfactory pictures can, therefore, be printed by the rapid rotary-type of film-printing machine when embodying feeding apparatus according to the present invention.

It will be appreciated that while the invention is adapted for use in connection with the rapid rotary-type film-printing machines, it can also be applied to the slower step-by-step film-printing machines if desired, and can further be utilized on any other cinematographic apparatus for which it is suitable.

What I claim as my invention and desire to secure by Letters Patent is:—

1. In cinematographic apparatus, mechanism for simultaneously feeding two superimposed cinematograph films having feed perforations therein, through feeding apparatus, and for driving one film from the other, comprising an intermediary member which engages the feed perforations in both films and is driven by one film and transmits such drive to the other film, and means for imparting a pull to the first said film in advance of the said intermediary member.

2. In cinematographic apparatus, mechanism for simultaneously passing two superimposed films having feed perforations therein, through film-feeding apparatus, and for securing continuous registration of the feed perforations in the two films, comprising a loose sprocket-wheel, means for feeding one film through the apparatus while maintaining the rearward sides of its feed perforations in engagement with the rear faces of the teeth on said sprocket-wheel, to drive the latter, and means for feeding the second film through the apparatus so that it may be driven by said sprocket-wheel, the front faces of the teeth on the latter maintaining engagement with the forward sides of the feed perforations in the second film.

3. In an apparatus for feeding cinematograph films which have feed perforations, the combination with means for operating upon a single film to pull it through the apparatus, of a member separate from the said means to enter the feed perforations in such film and be driven thereby, and to enter the feed perforations in, and thus drive, another film placed face to face against the first film.

4. In an apparatus for feeding cinematograph films which have feed perforations, the combination with means for pulling a film through the apparatus, of a loose sprocket-wheel separate from the said means to enter the feed perforations in such film and be rotated thereby, and to enter the feed perforations in, and thus drive, another film placed face to face against the first film.

5. In cinematograph film-printing machines, an apparatus for feeding films which have feed perforations, comprising in combination means for pulling a film through the apparatus, a member separate from the said means to enter the feed perforations in such film and be driven thereby, and to enter the feed perforations in, and thus drive, another film placed face to face against the first film, said member being situated closely adjacent the printing point, and guiding means for the films so arranged that the films first come into contact with each other approximately at the printing point, and break contact with each other approximately at the point where they leave the said drive-transmitting member, for the purpose specified.

6. In cinematographic apparatus, mechanism for simultaneously passing two cinematograph films, having feed perforations therein, through a film-feeding apparatus, comprising a loose sprocket-wheel 5 which engages both films, the rearward faces of its teeth engaging driving film and the forward faces of its teeth engaging the other film to drive it, substantially as described.

7. In a film-feeding apparatus, the loose sprocket-wheel 5 whereof the rearward faces of its teeth engage one film and the forward faces of its teeth engage another film, in combination with members to guide the films to and from said sprocket wheel as illustrated in the accompanying drawings.

In testimony whereof I affix my signature.

WILLIAM CECIL JEAPES.